United States Patent [19]
Viall, Jr.

[11] Patent Number: 4,691,944
[45] Date of Patent: Sep. 8, 1987

[54] TUBING CONNECTOR
[75] Inventor: Wilton S. Viall, Jr., Des Moines, Wash.
[73] Assignee: The Boeing Company, Seattle, Wash.
[21] Appl. No.: 866,123
[22] Filed: May 22, 1986
[51] Int. Cl.$^4$ ............................................. F16L 19/02
[52] U.S. Cl. .................... 285/348; 285/353; 285/321
[58] Field of Search ............... 285/348, 353, 234, 233
[56] References Cited
U.S. PATENT DOCUMENTS

| Re. 23,137 | 7/1949 | Hobbs . | |
|---|---|---|---|
| 546,314 | 9/1895 | Farrey . | |
| 1,742,793 | 1/1930 | Staples . | |
| 1,800,753 | 4/1931 | Replogle . | |
| 1,894,700 | 1/1933 | Parker . | |
| 1,912,299 | 5/1933 | Parker . | |
| 2,397,180 | 3/1946 | Wolfram . | |
| 2,398,555 | 4/1946 | Parker . | |
| 2,420,778 | 5/1947 | Herold . | |
| 2,427,260 | 9/1947 | Cowles . | |
| 2,474,880 | 7/1949 | Woodling . | |
| 2,523,578 | 9/1950 | Lewis ............................. | 285/348 X |
| 2,536,354 | 1/1951 | Cowles . | |
| 2,696,395 | 12/1954 | Ellis . | |
| 2,826,437 | 3/1958 | Detweiler et al. .............. | 285/353 X |
| 2,900,200 | 8/1959 | Umstadter ...................... | 285/332.3 |
| 2,950,928 | 8/1960 | Bowan ............................ | 285/348 X |
| 3,160,426 | 12/1964 | Faeser ............................. | 285/95 |
| 3,301,567 | 1/1967 | Barr ................................ | 285/348 X |
| 3,501,171 | 3/1970 | Baron .............................. | 285/52 |
| 3,615,160 | 10/1971 | Feather ........................... | 285/250 |
| 3,669,472 | 6/1972 | Nadsady ......................... | 285/233 X |
| 3,823,965 | 7/1974 | Emberson ....................... | 285/174 |
| 3,888,519 | 6/1975 | Smith et al. .................... | 285/55 |
| 4,150,847 | 4/1979 | De Cenzo ....................... | 285/233 X |
| 4,522,433 | 6/1985 | Valentine et al. .............. | 285/233 X |
| 4,538,842 | 9/1985 | Kowal et al. ................... | 285/234 X |

FOREIGN PATENT DOCUMENTS

| 854059 | 10/1970 | Canada ............................. | 285/233 |
| 782322 | 6/1935 | France ............................. | 285/353 |
| 1007010 | 10/1965 | United Kingdom ............. | 285/233 |

Primary Examiner—Thomas F. Gallaghan
Attorney, Agent, or Firm—Delbert J. Barnard

[57] ABSTRACT

A flanged end (98) of a section of tubing (90) is received within a tubular portion (112) of a first member (104) which includes a threaded end portion (110). An elastomeric O-ring (116) snugly surrounds the section of tubing (90) and contacts the flange (98). An elongated sleeve (120) surrounds the tubing section (90) and at its inner end (124) contacts the O-ring (116). A radial surface (144) on a second member (128) contacts a radial shoulder surface (126) on the sleeve (120). The second member (128) makes a threaded connection (110) with the first member (104). When the threads (110) are tightened, the radial surface (144) on the second member (128) applies an axial force on the shoulder (126), moving the sleeve (120) into compressing contact against the O-ring (116), but without transferring torque to the flange (98) at the end of the tubing section (90).

13 Claims, 9 Drawing Figures

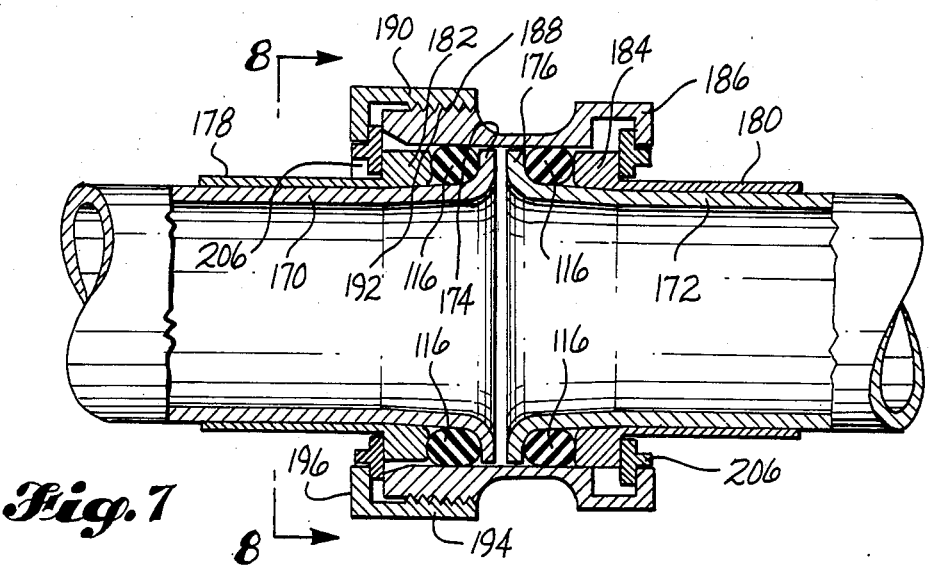
Fig. 7
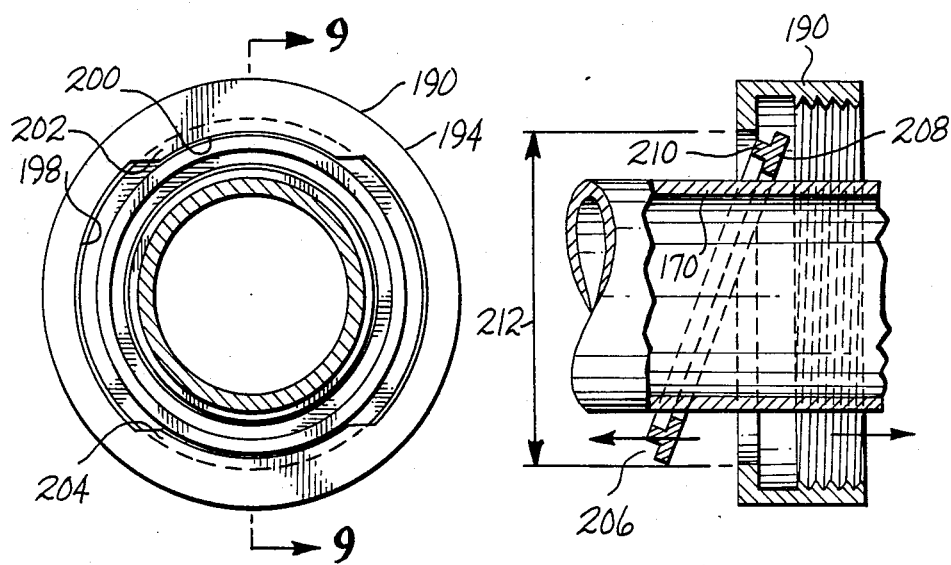
Fig. 8
Fig. 9

TUBING CONNECTOR

DESCRIPTION

1 Technical Field

The present invention relates to connectors and tubing used for conveying liquid or gaseous fluid. More particularly, it relates to the provision of an improved tubing connection which provides positive sealing, has tolerance for deflections without leaking, and provides low stressed retention of the tubing.

2. Background Art

The term "fluid" is used herein to mean either a "liquid" or "gas".

The tubing connector of the invention has application in any fluid system in which fluid leakage at the tubing connectors would present a problem. It has particular application in aircraft as each aircraft includes a large number of tubing connectors in fuel, hydraulic and pneumatic conduit systems, and such connectors are constantly subjected to external forces and/or vibrations.

The most common type of connector in use today in fluid conduit systems utilize leverage of screw threads on a connector fitting to cause plastic deformation of the tube ends. In this type of connection, the points of tube deformation are focal points of high stresses at which failures of the tube material eventually occur, resulting in a seal loss and fluid leakage from the system.

The tubing connector of the present invention does not require high stress deformation of tubing ends for the purpose of exerting a retention force. Rather, the retention force is provided by an interference of diameters. A seal is achieved at the connection by a compression of a standard "O-Ring". No twisting forces are imported to the tube when the coupling is connected. The internal stresses in the tube material is always low, reducing fatigue failures.

The tubing connector art is crowded art and a large number of patents have been granted on many ways of trying to obtain a reliable fluid-type connection.

Examples of prior art tubing connectors which exist in the patent literature are shown by: U.S. Pat. No. 546,314, granted Sept. 17, 1895, to Phillip H. Farrey; U.S. Pat. No. 1,742,793, granted Jan. 7, 1930, to Horace A. Staples; U.S. Pat. No. 1,800,753, granted Apr. 14, 1931, to James B. Replogle; U.S. Pat. No. 1,894,700, granted Jan. 17, 1933, to Arthur L. Parker; U.S. Pat. No. 1,912,299, granted May 30, 1933, to Arthur L. Parker; U.S. Pat. No. 2,397,180, granted Mar. 26, 1946, to John N. Wolfram; U.S. Pat. No. 2,398,555, granted Apr. 16, 1946, to Arthur L. Parker; U.S. Pat. No. 2,420,778, granted May 20, 1947, to Robert E. Herold; U.S. Pat. No. 2,427,260, granted Sept. 9, 1947, to Irving Cowles; U.S. Pat. No. 2,474,880, granted July 5, 1949, to George B. Woodling; U.S. Pat. No. Re. 23,137, granted July 26, 1949, to James C. Hobbs; U.S. Pat. No. 2,523,578, granted Sept. 26, 1950, to Lloyd Lewis; U.S. Pat. No. 2,536,354, granted Jan. 2, 1951, to Irving Cowles; U.S. Pat. No. 2,696,395, granted Dec. 7, 1954, to John D. Ellis; U.S. Pat. No. 2,900,200, granted Aug. 18, 1959 to Harold W. Umstadter; U.S. Pat. No. 3,160,426, granted Dec. 8, 1964, to Robert J. Faeser; U.S. Pat. No. 3,501,171, granted Mar. 17, 1970, to Alfred M. Baron; U.S. Pat. No. 3,615,160, granted Oct. 26, 1971, to Harry A. Feather; U.S. Pat. No. 3,888,519, granted June 10, 1975, to Verity C. Smith and Lawrence H. Reynolds; U.S. Pat. No. 2,696,395, granted Dec. 7, 1954, to John E. Ellis; and U.S. Pat. No. 3,823,965, granted July 16, 1974 to John E. Emberson.

Other more detailed features of the invention are described in the description of the best mode of the invention and are paticularly pointed out in the appended claims.

3. Disclosure of the Invention

In basic form, the tubing connector of the invention comprises an elongated section of tubing having a cylindrical sidewall defining a central fluid conveying passageway and an end portion including an outwardly directed radial flange. The end portion of the section of tubing is inserted into a tubular member which is to be joined to the tubular section. The tubular member and the tubing section define an annular space between them. An elastomeric O-ring is located in the annular space. The O-ring snugly surrounds the tubing section and contacts the radial flange at the end of the tubing section. A sliding, O-ring compressing, sleeve, surrounds the section of tubing. The sleeve comprises an elongated cylindrical sidewall portion, an inner end, an outwardly directed radial flange at said inner end, an inner end surface in contact with the O-ring, and a radial shoulder surface formed where the sidewall portion of the sleeve meets the outwardly directed radial flange. The connector comprises a rotatable screw joint means which includes a pressure exerting means having a radial surface which contacts the radial shoulder surface on the sleeve. In response to a tightening rotation of the screw joint means, the radial surface exerts an axial force on the shoulder surface of the sleeve, causing the sleeve to move axially against the O-ring. This causes the O-ring to compress axially and expand radially. As the O-ring expands radially, it makes tight sealing contact between the tubing section and the tubular member.

No twisting forces are imported to the tube during the tightening of the rotatable screw joint means. The arrangement is simple and there are no sectional parts which can be lost or dropped.

The invention can be used for connecting a single tubing section to a wall or stationary housing, or can be used for connecting two sections of tubing together.

BRIEF DESCRIPTION OF THE DRAWINGS

In the drawings, like element designations refer to like parts throughout, and:

FIG. 7 is an axial sectional view like FIGS. 1-6 of a fifth embodiment of the invention;

FIG. 8 is a cross-sectional view taken substantially along line 8—8 of FIG. 7; and FIG. 9 is a view like FIGS. 1-7, but of the connector ring member and the associated abutment ring member moved relatively along their tubing section, and showing the abutment member canted at an angle so that it can be slid relatively through the opening in the connector ring member.

ILLUSTRATED PRIOR ART

Figure 1:
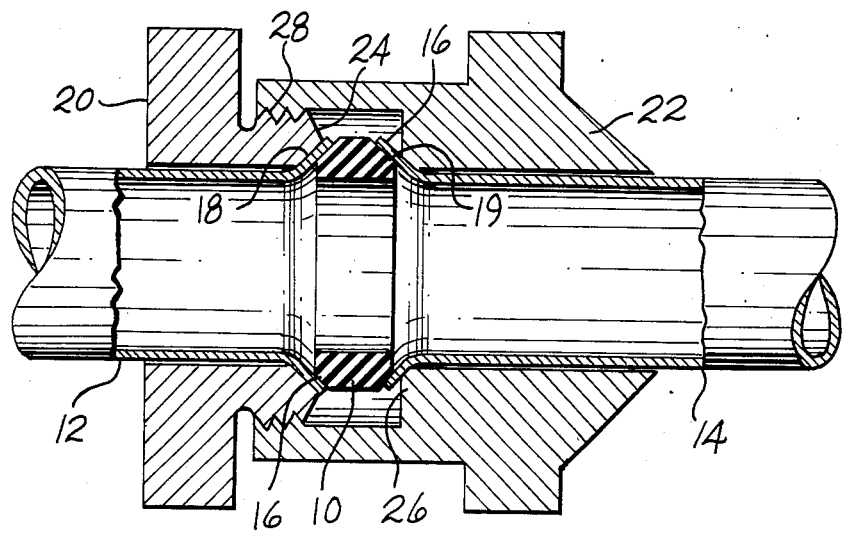
FIG. 1 is an axial sectional view of a prior art connector for two sections of tubing.

The prior art type connection shown by FIG. 1 comprises a ring member 10 which is positioned between flared ends 18, 19 of two tubing sections 12, 14 which are to be connected together. Member 10 includes beveled surfaces 16 on its sides which make contact with the inner surfaces of the flares 18, 19, in the manner illustrated. A male nut 20 surrounds the tubing section 12 and a female nut 22 surrounds the tubing section 14. Nut 20 includes a portion 24 which makes contact with the outer surface of flare 18. In similar fashion, nut 22 includes a portion 26 which makes contact with the outer surface of flare 19. The nuts 20, 22 are thread connected at 28. When the nuts 20, 22 are screwed together the shoulders 24, 26 press against the flares 18, 19, pushing the flares 18, 19 into tight sealing engagement with the ring member 10.

A problem with this type of connection is that an effective seal depends on plastic deformation of the flares 18, 19 where they make contact with the ring member 10. The regions of tube deformation are focal points of high stresses at which failure of the tube material eventually occurs, permitting fluid to escape from the system. Stated another way, the nuts 20, 22 must be rotated together to create a fluid tight seal between the side surfaces of the ring 10 and the inner surfaces of the flares 18, 19. A workman who has discovered a leak usually trys to stop the leak by screwing the nuts 20, 22 tighter together. As the nuts 20, 22 rotate, the shoulders 24, 26 dig into the flares 18, 19 and also apply torsion forces to the flares 18, 19. The tightening, instead of stopping the leak, usually causes a destruction to the flares 18, 19. Eventually cracks appear in the flares 18, 19 making it necessary to replace the sections of tubing 12, 14.

Figure 2:
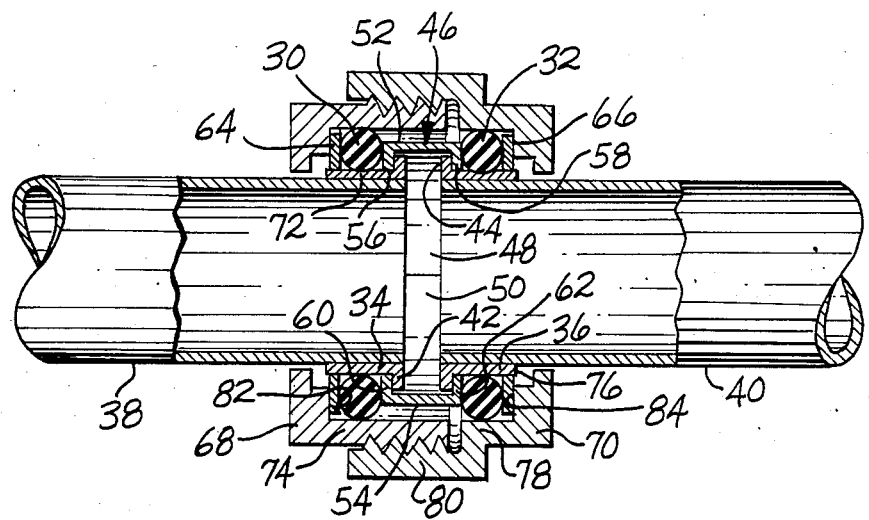
FIG. 2 is a view like FIG. 1, of a second prior art connector for two sections of tubing.

The prior art connection shown by FIG. 2 utilizes O-rings 30, 32 to provide the fluid tight seal. In a manner known per se, the O-rings are introduced into a space which has a radial dimension that is smaller than the cross-sectional diameter of the O-ring. Thus, the O-ring must be compressed radially in order for it to fit within the space. This interference fit of the O-ring creates a fluid tight seal at both the radial outer and inner boundaries of the O-ring.

The connection shown by FIG. 2 comprises a pair of flanged metallic rings 34, 36 which are swaged onto the end portions of tubing sections 38, 40. Each ring 34, 36 includes an outwardly extending radial flange 42, 44. A split ring 46 fits over and engages the flanges 42, 44. Ring 44 is constructed in two semi-circular halves. Each member or half includes a semi-circular web 52, 54, and radially inwardly directed flanges 56, 58 and 60, 62.

The O-ring 30 is positioned axially between the flanges 56, 60 and an annular washer 64. O-ring 32 is positioned axially between the flanges 58, 62 and an annular washer 66. The connector also comprises a male nut 68 and a female nut 70. O-ring 30 is positioned radially between an axial sleeve portion 72 of ring 34 and an axial tubular portion 74 of the nut 68. O-ring 32 is positioned radially between an axial tubular wall portion 76 of ring 36 and an axial tubular wall portion 78 of nut 70. The threaded connection is provided at 80. When the two nuts 68, 70 are screwed together, internal shoulder portions of the nuts 80, 88 move the washers 64, 82 axially together.

The particular connector shown by FIG. 2 solves the problems of FIG. 1, but in a manner which is relatively complicated, and which includes the use of a split ring member 46 which is difficult to install. Also, it has been found that the two parts 48, 50 of the ring member 46 are easy to drop during assembly and disassembly.

BEST MODE FOR CARRYING OUT THE INVENTION

Figure 3:
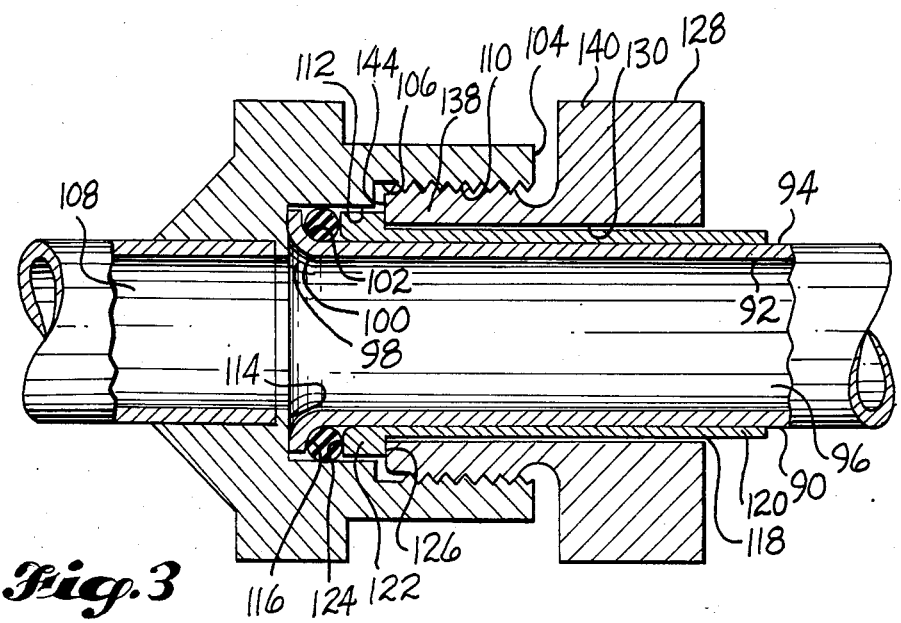
FIG. 3 is a view like FIGS. 1 and 2 of a first embodiment of the invention.

The embodiment of the invention shown by FIG. 3 comprises an elongated section of tubing 90 having a cylindrical sidewall with inner and outer surfaces 92, 94, and defining a central fluid conveying passageway 96. Tubing section 90 includes a flared end portion 98 having an outwardly curving surface 100 which is an extension of surface 92 and a second outwardly curving surface 102 which is an extension of the surface 94. Surface 100 is a convex surface and surface 102 is a concave surface.

The connector shown by FIG. 3 also comprises a member 104 which is to be joined to the tubing section 90. This member may be a housing, a fitting attached to a housing, a fitting attached to another section of tubing, etc.

Member 104 comprises a socket 106 which communicates with a fluid conveying passageway 108. The socket includes a threaded outer end portion 110, a cylindrical inner end portion 112, and an inner end wall 114. Wall 114 is in the nature of a shoulder between socket tubular portion 112 and the smaller diameter passageway 108.

As shown by FIG. 3, the flared end portion 98 of tubing section 90 is dimensioned to be insertable into the socket 106. Flared end portion 98 fits rather closely within the cylindrical inner end portion 112 of the socket 106 and its curved surface 100 contacts the socket end wall 114. Preferably, passage 96 in tubing section 90 and passage 108 in member 104 are substantial equal in diameter.

A radial space is defined between the cylindrical surface 112 of member 104 and the outer sidewall surface 94 of tubing section 90. A standard O-ring seal 116 fits into this space. The cross sectional diameter of O-ring member 116 is larger than the radial dimension of such space. Therefore, the O-ring 116 makes an interference fit within the space. O-ring member 116 is constructed from an elastomeric material capable of compressing in size in the radial direction as the O-ring member 116 is moved into the undersized space. This compression of the O-ring 116 in the radial direction creates a seal where the outer surface of the O-ring 116 contacts the cylindrical surface 112 and a seal where the inner surface of the O-ring 116 contacts surfaces 94 and 102 of tubing member 90.

The connector shown by FIG. 3 also comprises a sleeve member 118 which includes an elongated cylindrical sidewall portion 120 and an outwardly directed radial flange 122 at its inner end. The inner end portion of the sleeve member 118 has an outside diameter which is slightly smaller than the inside diameter of the inner portion 112 of socket 106. Sleeve 118 also includes an inner end surface 124 which contacts the O-ring 116. An axially outwardly directed shoulder surface is formed between the outside diameter of the cylindrical sidewall portion 120 and the outer diameter of the inner end portion of sleeve member 118.

The embodiment shown by FIG. 3 is completed by a pressure exerting retainer member 128 which includes a central passageway 130 sized to snugly receive the outside diameter of the sleeve 118. Member 128 also includes an externally threaded nipple portion 138 and a nut portion 140 having wrench flat surfaces for receiving the jaws of a wrench. Nut portion 140 may have six sides or wrench flat surfaces, i.e. in the nature of a hex nut. Nut section 140 forms the outer end of member 128 and threaded nipple portion 138 forms the inner end of member 128.

The nipple 138 includes an end surface 144 which contacts the shoulder surface 126 on the sleeve 118. The external threads on the nipple 138 engage the internal threads of socket portion 110. When the member 128 is rotated in the direction causing member 128 to be screwed in the socket, the nipple 138 moves axially towards the shoulder 114. As nipple 138 moves, it contacts sleeve member 118, where surfaces 126, 144 meet, and this causes sleeve 118 to also be moved towards the shoulder 114. Such movement of sleeve 118 causes the O-ring 116 to be squeezed between surfaces 102, 124. This squeezing increases the sealing pressure at the inner and outer radial boundaries of the O-ring 116, enhancing the sealing contact which occurs between O-ring member 116 and the surfaces 102 and 112. The O-ring member 116 is squeezed radially, but is isolated from torsion forces by the presence of sleeve member 118, and its flanged end portion 122. That is, the inner end surface 144 of the nipple 138 bears against surface 126 of member 118, as the member 128 is rotated.

Figure 4:
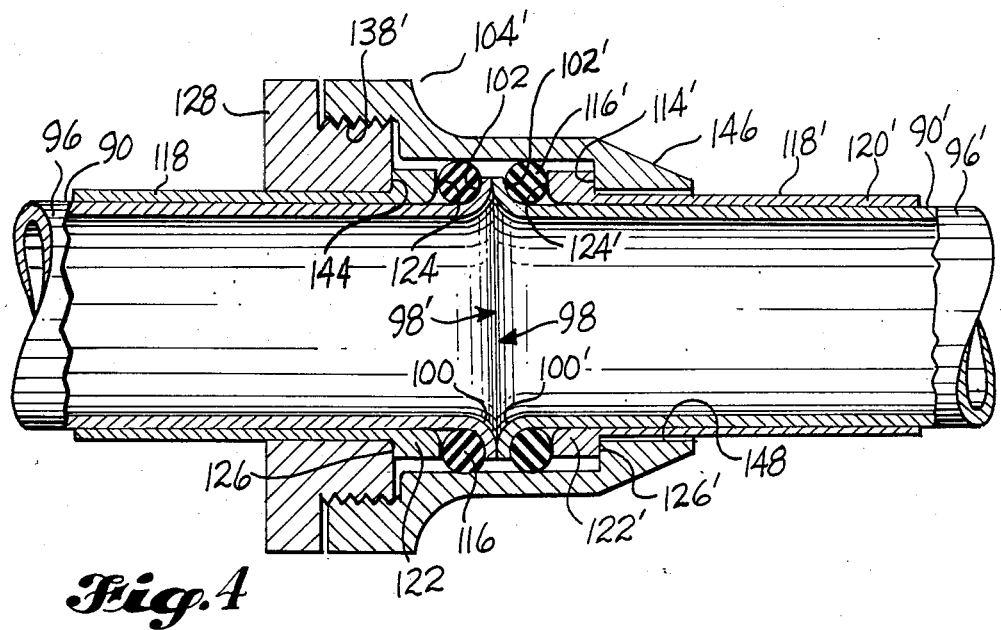
FIG. 4 is a view like FIGS. 1-3, of a second embodiment of the invention.

FIG. 4 discloses a connector between two tubing sections 90, 90'. In this embodiment, the member 104' includes an end portion 146 opposite the threaded portion 138' of the socket, in which there is formed an elongated axial opening 148. A second sleeve member 118' is provided and the axially elongated cylindrical portion 120' of this member 118' is relatively snugly received within the opening 148. The sidewall of tubing member 90' is snugly received within the sleeve 118'.

In the embodiment shown by FIG. 4, the surfaces 100, 100' of the flared ends 98, 98' of the tubing sections 90, 90' make contact when the connection is assembled. When the numbers 128, 104' are screwed together, the surface 144 on member 128 is moved towards the surface 114' on member 104'. The contact which occurs between surface 144 on member 128 and surface 126 on sleeve member 118, and the contact which occurs between surface 114' on member 104' and surface 126' on member 118', causes the surfaces 124, 124' to be moved towards each other, and towards the location of contact of the surfaces 100, 100'. This causes both of the O-ring 116, 116' to be compressed axially. This compression of the O-rings 116, 116' increases the pressure at their inner and outer radial boundaries, enhancing the sealing contact which occurs at such boundaries, in the manner described above in connection with the embodiment shown by FIG. 3.

Figure 5:
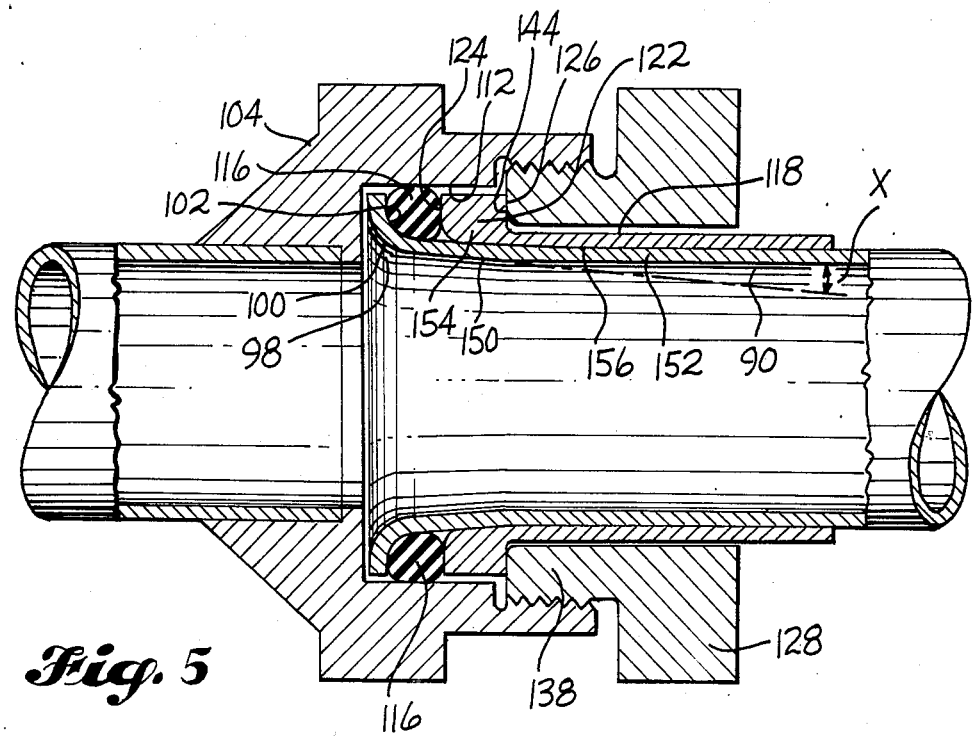
FIG. 5 is a view like FIGS. 1-4, of a third embodiment of the invention.

FIG. 5 illustrates a modified construction of the inner end portions of tubing section 90 and sleeve member 118. This same modification can be made to the inner end portions of tubing section 90' and sleeve member 118', in the embodiment of FIG. 4.

Referring to FIG. 5, the tubing member 90 is formed to include a conical section 150 between its straight section 152 and the flared end 98. In similar fashion, the flanged end portion 122 of sleeve 118 is formed to include a conical surface 154 at the end of a straight cylindrical surface 156. The taper angle x of surface 154 is substantially identical to the taper angle of the conical portion 150 of the tube section 90. Owing to this construction, the sleeve 118 is limited in the amount of axial travel that it can make relative to sleeve section 90 in response to the tightening of the member 128. As member 128 is rotated in the thread tightening direction, surface 144 will exert an endwise force on 126, in the manner described above in connection with the embodiment shown by FIG. 3. The contact between surface 144 and surface 126 will transmit the axial travel of nipple 138 to the flanged end 122 of sleeve 118. Initially, flanged end portion 122 will slide along conical portion 150 of tubing section 90. As should be evident, the tapered nature of the contacting surfaces 154, 158 will result in a limit in the amount of travel of the surface 124 on member 118 relative to the surface 102 on tubing section 90. Movement of the surfaces of tapered sections 150, 154 tightly together is felt back at the wrench applied to member 128 and signals the user as to when to stop applying a tightening torque. This feature provides a way of gauging the amount of axial compression applied to the O-ring 116.

Figure 6:
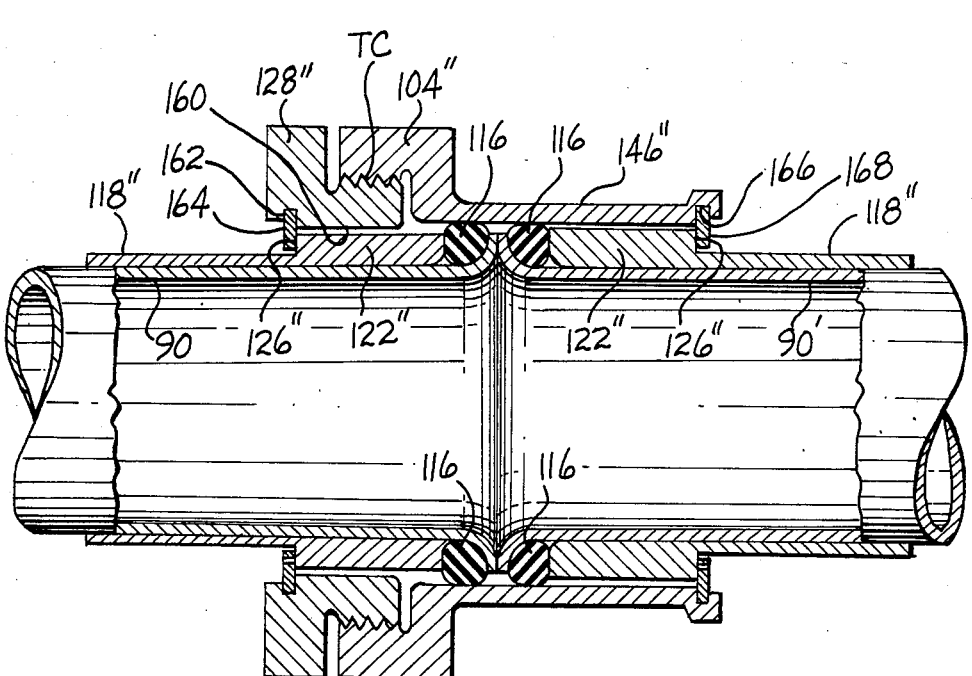
FIG. 6 is a view like FIGS. 1-5, of a fourth embodiment of the invention.

The embodiment shown by FIG. 6 provides a way of disconnecting a coupling in which the threaded connection has been damaged to the extent that it is not possible to decouple the connection by unthreading the two thread carrying members.

In this embodiment, the member 128" includes an axial passageway 160 which is slightly larger in diameter than the outside diameter of sleeve member 118" in the region of the end flage 122". A circumferential groove 162 is formed in the sidewall of passage 160, near the outer end of member 128". A snap ring 164 is located in this groove 162. The snap ring 164 has a radially inner portion which contacts shoulder 126". In similar fashion, member 104" is constructed to include an axially elongated section 146" which defines an axial passageway having a diameter slightly larger than the outside diameter of the flanged portion 122" of tubing section 90'. A circumferential groove 166 is formed in the inner wall of such passageway, near the outer end of portion 146". A snap ring 168 is installed into the groove 166. Snap ring 168 includes an inner portion which makes contact with shoulder 126" on member 118".

As should be apparent, when the members 128" and 104" are screwed together, the two snap rings 164, are moved relatively together. In normal operation, the radially inner portions of the snap rings 164, 168 function the same as the nipple end surface 144 and the shoulder surface 126 in the embodiment shown by FIG. 4. However, if thread damage should occur at the threaded connection TC, of a type preventing the members 128", 104" from being threaded apart, the connection can be disconnected by a removal of the snap rings 164, 166. Firstly, one of the snap rings 164, 168 is removed, to permit a removal of one of the tubing sections 90, 90", and its sleeve 118" or 188", out from the assembly 128", 104". Then, the other snap ring 164, 168 is removed, so that the assembly 128", 124" can be slid endwise off of the second tubing section 90, or 90'. Then, new members 128", 104" can be used to make a new connection between the tubing sections 90, 90'".

The embodiment shown by FIGS. 7–9 provides another way of accomplishing the objective of the embodiment shown in FIG. 6. That is, it provides a second way of disconnecting a coupling to which the threaded connection has been damaged to the extent that it is not possible to reuse the two thread carrying members.

This embodiment comprises a pair of tubing sections 170, 172, as in the earlier embodiments of the invention. Tubing section 170 includes a flange 174 at its inner end and tubing section 172 includes a similar flange 176 at its inner end. A sleeve 178 surrounds tubing section 170. A similar sleeve 180 surrounds tubing section 172. Sleeve 178 includes an enlarged end portion 182 at its inner end. Sleeve 180 includes an enlarged end portion 184 at its inner end.

The screw connection comprises a first connector ring 186 having an externally threaded portion 188, and a second connector ring 190 having an internally threaded portion 192. As illustrated, the threads 192 mate with the threads 188.

FIG. 8 shows the construction of the outer end of connector ring 190. The outer end of connector ring 186 is of like construction.

Referring to FIG. 7 and 8, ring member 190 includes a cylindrical wall 194 on which the threads 192 are formed and an end wall 196. End wall 196 includes an opening having a major diameter portion 198 (FIG. 8) and a minor diameter portion 200. End wall sections 202, 204 outwardly border the minor diameter regions 200.

An abutment ring member 206 is associated with each end wall. Abutment member 206 comprises a radial section 208 and an axial section 210. As shown by FIGS. 7 and 9, the axial section 210 intersects a midportion of the radial section 208, such that a first portion or radial section 208 projects radially outwardly from axial section 210 and a second portion of radial section 208 projects radially inwardly from the axial section 210.

As shown by FIGS. 7 and 8, the outer diameter of axial section 210 substantially conforms to the minor diameter 200 of the opening in end wall 196. The outside diameter of radial section 208 is slightly smaller than the major diameter 198 of the opening in end wall 196. As a result of this construction, the abutment ring 206 can be assembled with the connector ring 190, in the manner shown by FIG. 7. When in the position shown by FIG. 7, the abutment ring member 206 makes abutting contact with the inner surface of the end portion 182 of sleeve 178. In assembly, the abutment ring 206 functions the same as the snap ring in the embodiment of FIG. 6.

Also owing to the construction of abutment ring 206 and the end wall of connector ring 190, described above, following a disconnection of ring member 190 from connector ring 186, the connector ring 190 and the abutment member 206 can be slid along the tubing section 170, away from the joint region, and then the abutment ring 206 can be canted into the position shown by FIG. 9. In this canted position, the cant diameter 212 of the abutment ring 206 becomes slightly less than the minor diameter 200 of connector ring 190. This allows the abutment ring 206 and the connector ring 190 to be moved apart, axially of the tubing section 107. That is, in its canted position, the abutment ring 206 can pass through the opening in the end wall 196 of ring member 190. The outside diameter of abutment ring 206 is slightly smaller than the major diameter 198 of the opening in end wall 196. When the abutment 206 is in a radial position, as shown by FIG. 7, the end wall sections 202, 204 which are situated radially outwardly from the minor diameter regions 200, contact the portion of radial section 208 that is outwardly of the axial section 210. The outer periphery of the axial section 210 is snugly received within the two regions of the minor diameter 200 (FIGS. 7 and 8). When the abutment ring 206 is canted, the cant diameter 212 is the effective diameter of the abutment ring 206 in the minor diameter region of the opening in ring member 190. As a result, all portions of the connector ring 206 can now pass through the opening in the endwall 196.

As mentioned above, the abutment ring 206 at the outer end of ring member 186, and the outer end wall of connector ring 186, are identical to the end wall 196 and the abutment ring 206 at the end of connector ring 190.

In use, the damaged connector rings 186, 190 are separated, in any manner possible. This may require some cutting through either the ring member 190 at or endwise outwardly of the threads. Or, it may require a cutting through the axial section of ring member 186. Following separation of connector rings 186, 190, each connector ring 190 and its abutment ring 206 can be manipulated in the manner shown by FIG. 9, and described below, so as to allow passage of the abutment ring 206 through the opening in the end wall of the connector ring 186 or 190. The abutment ring is then slid along the tubing section 170. The minor diameter 200 is larger than the outside diameter of the flange 174, 176. Thus, after the abutment ring 206 has been slid through the ring member 186 or 190, such ring member can be slid endwise over the flange 174, 176, and then discarded. Then, a new ring member 186 can be placed on tubing section 172 and a new ring member 190 can be placed on the tubing section 170. That is, they can be slid endwise of the tubing sections 170, 172, with the flanges 174, 176 passing through the openings in the end walls of the ring members 186, 190. Then, the abutment ring 206 associated with the new connector ring 186 can be reunited with connector ring 186, by reversing the manipulation shown by FIG. 9. In like fashion, the abutment ring 206 associated with connector ring 190 can be reignited with connector ring 190. Then, the two connector rings can be screwed together, until tight, to make a new fluid-tight connection.

As in the earlier embodiments, an elastomeric O-ring 116 is positioned radially between the tubing sections 170, 172 and at an inner cylindrical surface portion of the connector ring 186. The O-rings 116 are positioned axially between the flanges 174, 176 and the outer ends of the end portions 182, 184 of sleeves 178, 180.

It is to be understood that the embodiments which have been illustrated and describe constitute only some examples of the forms that the invention may take and that the invention is not to be limited by such examples, but only by the appended claims, interpreted by use of the doctrine of equivalents.

What is claimed is:
1. A tubing connector, comprising:
an elongated section of tubing comprising a cylindrical sidewall defining a central fluid conveying passageway, and an end portion including an outwardly directed radial flange;
means to be joined to said tubing section, in a manner providing a fluid-tight joint between said means to be joined and said tubing section, said means to be joined comprising a tubular member into which the end portion of the section of tubing is received, said tubular member and said tubing section defining an annular space between them;

an elastomeric O-ring in said annular space snugly surrounding said tubing section and contacting the radial flange at the end of the tubing section;

a sliding, O-ring compressing, sleeve, comprising an elongated cylindrical sidewall portion which surrounds said section of tubing, an inner end, an outwardly directed radial flange at said inner end, an inner end surface in contact with the O-ring, and a radial shoulder surface formed where the sidewall portion of the sleeve meets the outwardly directed radial flange;

a pressure exerting means having a radial surface which contacts the radial shoulder surface on said sleeve;

rotatable screw joint means between said tubular member and said pressure exerting means;

wherein in response to a tightening rotation of the screw joint means said pressure exerting means exerts an axial force on the shoulder surface of the sleeve, for moving said sleeve axially against the O-ring, to cause the O-ring to compress axially and expand radially, for sealing between said tubing section and said tubular member;

said tubular member has a threaded axial portion which concentrically surrounds said sleeve, and said rotatable screw joint means has a mating threaded axial portion which concentrically surrounds the sleeve, and wherein the radial surface on the rotatable screw joint means is an end surface; and said section of tubing includes a conical region immediately axially inwardly of the radial flange, which increases in diameter as it extends outwardly towards the flange, and wherein the inner end of the sleeve is of such a size and shape that its axial outward movement, in response to a tightening of the screw joint means will be effectively stopped by a tight fit between it and the conical region when the O-ring has been compressed a predetermined desirable amount.

2. A tubing connector, comprising:

a first elongated section of tubing comprising a cylindrical sidewall defining a central fluid conveying passageway, and an end portion including an outwardly directed radial flange;

a second elongated section of tubing comprising a cylindrical sidewall defining a central fluid conveying passageway, and an end portion including an outwardly directed radial flange;

said first and second sections of tubing being coaxially aligned, with their flanges directed toward each other;

a first elastomeric O-ring snugly surrounding the first tubing section and contacting the radial flange at the end of said first tubing section;

a second elastomeric O-ring snugly surrounding said second tubing section and contacting the radial flange at the end of said second tubing section;

a first sliding, O-ring compressing, sleeve, surrounding the first section of tubing, and including an end surface in contact with the first O-ring, and a radial shoulder surface spaced axially outwardly from said end surface;

a second sliding, O-ring compressing, sleeve, surrounding said second section of tubing, and having an inner end surface in contact with the second O-ring, and a radial shoulder surface spaced axially inwardly from said end surface;

a first tubular screw joint member surrounding the inner end portions of both sections of tubing, both sleeves, and both O-rings, said member carrying a radial surface means at one end which makes abutting contact with the radial shoulder surface on the first sleeve, and has an axially extending threaded portion at its opposite end; and said first member having an internal diameter larger than an external diameter of an inner end portion of the first sleeve, and said member includes a removable ring which provides the radial surface means that is in contact with the radial shoulder surface on said first sleeve;

said first member includes an outer end wall having an axial opening therein, said axial opening having a major diameter portion wherein the diameter of the opening is slightly larger than the diameter of the removable ring, and a minor diameter portion in which the diameter is smaller than the outside diameter of the removable ring, so that when the removable ring is positioned against the end wall such ring will contact portions of the end walls adjoining the minor diameter portion of the opening in the end wall, said removable ring having a larger inside diameter than the outside diameter of the tubing section, enabling said removable ring to be canted in position to make contact with the tubing section at generally diametrically opposite locations, and wherein the canted diameter of said removable ring is slightly less than the minor diameter of the opening in the end wall of the first member, so that the removable ring can be moved relatively through such opening in the end wall when the removable ring is in a canted position, and the minor diameter portion of the opening is aligned with the cant diameter of the canted removable ring; and a second tubular screw joint member concentrically surrounding the second sleeve, and including a radial surface means in contact with the radial shoulder of the second sleeve, and a threaded portion in mating engagement with the first member.

3. A tubing connector according to claim 2, wherein said second sleeve snugly surrounds the second tubing section, said second sleeve having an outwardly directed radial flange at an inner end thereof, said inner end being positioned adjacent the second O-ring and including the radial surface which contacts the second O-ring, said radial flange having a radial shoulder surface on the side thereof opposite the second O-ring, where the flange joins the second sleeve, and wherein the axial passageway in said second member through which the second section of tubing extends is of a diameter larger than said second sleeve, wherein said second sleeve is situated within said passageway, and wherein said second member includes a radial surface which contacts said radial shoulder surface.

4. A tubing connector according to claim 2, wherein said first sleeve has an elongated cylindrical sidewall portion which snugly surrounds said section of tubing, and an outwardly directed radial flange at its inner end, said inner end of the sleeve having an outside diameter at the flange which is slightly smaller than the diameter of an axially extending cylindrical portion of the first member, said sleeve having an inner end surface in contact with the O-ring, and a radial shoulder surface formed where the elongated cylindrical sidewall portion of the sleeve meets the outwardly directed radial flange.

5. A tubing connector according to claim 2, wherein the first member has a central passageway sized to snugly receive the outside diameter of the sleeves, an externally threaded nipple portion and a nut portion, said nut portion having wrench flat surfaces for receiving the jaws of a wrench, with the threads of the nipple being joinable with the threads of the second member.

6. A tubing connector, comprising:
- a first elongated section of tubing comprising a cylindrical sidewall defining a central fluid conveying passageway, and an end portion including an outwardly directed radial flange;
- a second elongated section of tubing comprising a cylindrical sidewall defining a central fluid conveying passageway, and an end portion including an outwardly directed radial flange;
- said first and second sections of tubing being coaxially aligned, with their flanges directed toward each other;
- a first elastomeric O-ring snugly surrounding the first tubing section and contacting the radial flange at the end of said first tubing section;
- a second elastomeric O-ring snugly surrounding said second tubing section and contacting the radial flange at the end of said second tubing section;
- a first sliding, O-ring compressing, sleeve, surrounding the first section of tubing, and including an end surface in contact with the first O-ring, and a radial shoulder surface spaced axially outwardly from said end surface;
- a second sliding, O-ring compressing, sleeve, surrounding said second section of tubing, and having an inner end surface in contact with the second O-ring, and a radial shoulder surface spaced axially inwardly from said end surface;
- a first tubular screw joint member surrounding the inner end portions of both sections of tubing, both sleeves, and both O-rings, said member carrying a radial surface means at one end which makes abutting contact with the radial shoulder surface on the first sleeve, and has an axially extending threaded portion at its opposite end; and
- a second tubular screw joint member concentrically surrounding the second sleeve, and including a radial surface means in contact with the radial shoulder surface of the second sleeve, and a threaded portion in mating engagement with the first member;
- said second member having an internal diameter which is larger than an external diameter of the inner end portion of the second sleeve, and said second member carries a removable ring which provides the radial surface means that is in contact with the radial shoulder surface on the second sleeve;
- said second member includes an outer end wall having an axial opening therein, said axial opening having a major diameter portion wherein the diameter of the opening is slightly larger than the diameter of the removable ring, and a minor diameter portion in which the diameter is smaller than the outside diameter of the removable ring, so that when the removable ring is positioned against the end wall such ring will contact portions of the end walls adjoining the minor diameter portion of the opening in the end wall, said removable ring having a larger inside diameter than the outside diameter of the tubing section, enabling said removable ring to be canted in position to make contact with the tubing section at generally diametrically opposite locations, and wherein the canted diameter of said removable ring is slightly less than the minor diameter of the opening in the end wall of the second member, so that the removable ring can be moved relatively through such opening in the end wall when the removable ring is in a canted position, and the minor diameter portion of the opening is aligned with the cant diameter of the canted removable ring.

7. A tubing connector according to claim 6, wherein said second sleeve snugly surrounds the second tubing section, said second sleeve having an outwardly directed radial flange at an inner end thereof, said inner end being positioned adjacent the second O-ring and including the radial surface which contacts the second O-ring, said radial flange having a radial shoulder surface on the side thereof opposite the second O-ring, where the flange joins the second sleeve, and wherein the axial passageway in said second member through which the second section of tubing extends is of a diameter larger than said second sleeve, wherein said second sleeve is situated within said passageway, and wherein said second member includes a radial surface which contacts said radial shoulder surface.

8. A tubing connector according to claim 6, wherein said first sleeve has an elongated cylindrical sidewall portion which snugly surrounds said section of tubing, and an outwardly directed radial flange at its inner end, said inner end of the sleeve having an outside diameter at the flange which is slightly smaller than the diameter of an axially extending cylindrical portion of the first member, said sleeve having an inner end surface in contact with the O-ring, and a radial shoulder surface formed where the elongated cylindrical sidewall portion of the sleeve meets the outwardly directed radial flange.

9. A tubing connector according to claim 6, wherein the first member has a central passageway sized to snugly receive the outside diameter of the sleeves, an externally threaded nipple portion and a nut portion, said nut portion having wrench flat surfaces for receiving the jaws of a wrench, with the threads of the nipple being joinable with the threads of the second member.

10. A tubing connector, comprising:
- a first elongated section of tubing comprising a cylindrical sidewall defining a central fluid conveying passageway, and an end portion including an outwardly directed radial flange;
- a second elongated section of tubing comprising a cylindrical sidewall defining a central fluid conveying passageway, and an end portion including an outwardly directed radial flange;
- said first and second sections of tubing being coaxially aligned, with their flanges directed toward each other;
- a first elastomeric O-ring snugly surrounding the first tubing section and contacting the radial flange at the end of said first tubing section;
- a second elastomeric O-ring snugly surrounding said second tubing section and contacting the radial flange at the end of said second tubing section;
- a first sliding, O-ring compressing, sleeve, surrounding the first section of tubing, and including an end surface in contact with the first O-ring, and a radial shoulder surface spaced axially outwardly from said end surface;

a second sliding, O-ring compressing, sleeve, surrounding said second section of tubing, and having an inner end surface in contact with the second O-ring, and a radial shoulder surface spaced axially inwardly from said end surface;

a first tubular screw joint member surrounding the inner end portions of both sections of tubing, both sleeves, and both O-rings, said member carrying a radial surface means at one end which makes abutting contact with the radial shoulder surface on the first sleeve, and has an axially extending threaded portion at its opposite end;

said first member having an internal diameter larger than an external diameter of an inner end portion of the first sleeve, and said member includes a removable snap ring which provides the radial surface means that is in contact with the radial shoulder surface on said first sleeve;

said first member includes an outer end wall having an axial opening therein, said axial opening having a major diameter portion wherein the diameter of the opening is slightly larger than the diameter of the removable ring, and a minor diameter portion in which the diameter is smaller than the outside diameter of the removable ring, so that when the removable ring is positioned against the end wall such ring will contact portions of the end walls adjoining the minor diameter portion of the opening in the end wall, said removable ring having a larger inside diameter than the outside diameter of the tubing section, enabling said removable ring to be canted in position to make contact with the tubing section at generally diametrically opposite locations, and wherein the canted diameter of said removable ring is slightly less than the minor diameter of the opening in the end wall of the first member, so that the removable ring can be moved relatively through such opening in the end wall when the removable ring is in a canted position, and the minor diameter portion of the opening is aligned with the cant diameter of the canted removable ring;

a second tubular screw joint member concentrically surrounding the second sleeve, and including a radial surface means in contact with the radial shoulder of the second sleeve, and a threaded portion in mating engagement with the first member;

said second member having an internal diameter which is larger than an external diameter of the inner end portion of the second sleeve, and said second member carries a removable ring which provides the radial surface means that is in contact with the radial shoulder surface on the second sleeve; and said second member includes an outer end wall having an axial opening therein, said axial opening having a major diameter portion wherein the diameter of the opening is slightly larger than the diameter of the removable ring, and a minor diameter portion in which the diameter is smaller than the outside diameter of the removable ring, so that when the removable ring is positioned against the end wall such ring will contact portions of the end walls adjoining the minor diameter portion of the opening in the end wall, said removable ring having a larger inside diameter than the outside diameter of the tubing section, enabling said removable ring to be canted in position to make contact with the tubing section at generally diametrically opposite locations, and wherein the canted diameter of said removable ring is slightly less than the minor diameter of the opening in the end wall of the second member, so that the removable ring can be moved relatively through such opening in the end wall when the removable ring is in a canted position, and the minor diameter portion of the opening is aligned with the cant diameter of the canted removable ring.

11. A tubing connector according to claim 10, wherein said second sleeve snugly surrounds the second tubing section, said second sleeve having an outwardly directed radial flange at an inner end thereof, said inner end being positioned adjacent the second O-ring and including the radial surface which contacts the second O-ring, said radial flange having a radial shoulder surface on the side thereof opposite the second O-ring, where the flange joins the second sleeve, and wherein the axial passageway in said second member through which the second section of tubing extends is of a diameter larger than said second sleeve, wherein said second sleeve is situated within said passageway, and wherein said second member includes a radial surface which contacts said radial shoulder surface.

12. A tubing connector according to claim 10, wherein said first sleeve has an elongated cylindrical sidewall portion which snugly surrounds said section of tubing, and an outwardly directed radial flange at its inner end, said inner end of the sleeve having an outside diameter at the flange which is slightly smaller than the diameter of an axially extending cylindrical portion of the first member, said sleeve having an inner end surface in contact with the O-ring, and a radial shoulder surface formed where the elongated cylindrical sidewall portion of the sleeve meets the outwardly directed radial flange.

13. A tubing connector according to claim 10, wherein the first member has a central passageway sized to snugly receive the outside diameter of the sleeves, an externally threaded nipple portion and a nut portion, said nut portion having wrench flat surfaces for receiving the jaws of a wrench, with the threads of the nipple being joinable with the threads of the second member.

* * * * *

UNITED STATES PATENT AND TRADEMARK OFFICE
CERTIFICATE OF CORRECTION

PATENT NO. : 4,691,944
DATED : September 8, 1987
INVENTOR(S) : Wilton S. Viall, Jr.

It is certified that error appears in the above-identified patent and that said Letters Patent are hereby corrected as shown below:

Column 1, line 37, "is" should be -- are --.

Column 1, line 39, after "is", insert -- a --.

Column 1, line 68 and column 2, line 1, delete "U.S. Pat. No. 2,696,395, granted Dec. 7, 1954, to John E. Ellis;" --.

Column 2, line 5, "paticularly" should be -- particularly --.

Column 5, line 53, "O-ring" should be -- O-rings --.

Column 6, line 33, "flage 122" should be -- flange 122 --.

Column 6, line 65, "tubing sections 90, 90'' " should be -- tubing sections 90, 90' --.

UNITED STATES PATENT AND TRADEMARK OFFICE
CERTIFICATE OF CORRECTION

PATENT NO. : 4,691,944
DATED : September 8, 1987
INVENTOR(S) : Wilton S. Viall, Jr.

It is certified that error appears in the above-identified patent and that said Letters Patent are hereby corrected as shown below:

Column 7, line 32, "or" should be -- of --.

Column 8, line 13, "at the end" should be -- at the outer end --.

Column 8, line 41, "reignited" should be -- reunited --.

Column 8, line 51, "describe" should be -- described --.

Signed and Sealed this

Twenty-seventh Day of September, 1988

*Attest:*

DONALD J. QUIGG

*Attesting Officer*     *Commissioner of Patents and Trademarks*